United States Patent [19]

Wright

[11] 4,077,577

[45] Mar. 7, 1978

[54] NON-STRESSED, HIGH STRENGTH, CEMENT-CONTAINING PIPE AND ITS PRODUCTION

[75] Inventor: James Wright, Pinson, Ala.

[73] Assignee: Cement Asbestos Products Company, Birmingham, Ala.

[21] Appl. No.: 655,189

[22] Filed: Feb. 4, 1976

[51] Int. Cl.² .......................................... B65H 81/00
[52] U.S. Cl. ................................ 242/7.22; 138/150; 138/175
[58] Field of Search ............... 138/175, 154, 150, 174, 138/177; 242/7.22

[56] References Cited

U.S. PATENT DOCUMENTS

| | | | |
|---|---|---|---|
| 2,358,758 | 9/1944 | Eames | 138/175 |
| 2,552,599 | 5/1951 | Stout | 138/150 |
| 3,520,749 | 7/1970 | Rubenstein | 138/175 |
| 3,706,615 | 12/1972 | Nishiyama et al. | 138/175 |
| 3,950,465 | 4/1976 | Farahar | 138/175 |

Primary Examiner—Richard E. Aegerter
Assistant Examiner—L. Footland

Attorney, Agent, or Firm—R. J. Drew; E. J. Schaffer

[57] ABSTRACT

Non-stressed, high strength, substantially inflexible, rigid, cement-containing pipe, for example, asbestos-cement pipe well adapted as high pressure water pipe, comprising a tubular article body of spirally wound up layers of asbestos-cement, and a plurality of helical windings of a continuous filament of an aromatic polyamide fiber known and obtainable as KEVLAR aramid fiber about one or more of the asbestos-cement layers within the interior of the pipe without being stretched and without being in tension. The aromatic polyamide fiber of the continuous filament is of high tensile strength of about 390,000 psi or higher and a low elongation capability of no more than 7%, and the continuous filament of the helical windings is maintained about the cement-containing composition within the interior of the pipe without being stretched and without being in tension. Non-stressed, high strength concrete pipe is also embodied in the invention. The outer exposed main surface of the pipe is usually free or substantially free of the continuous filament.

21 Claims, 6 Drawing Figures

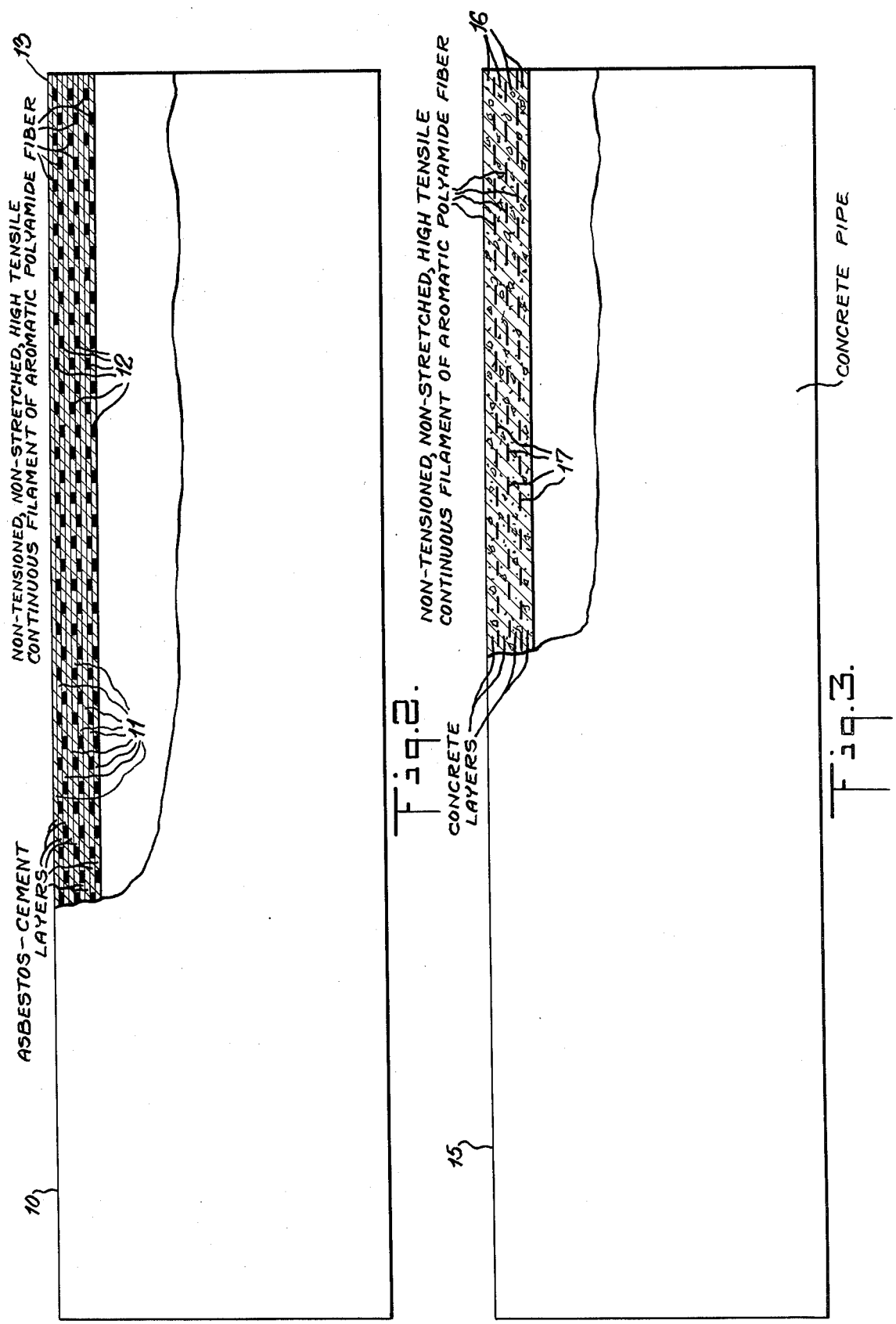

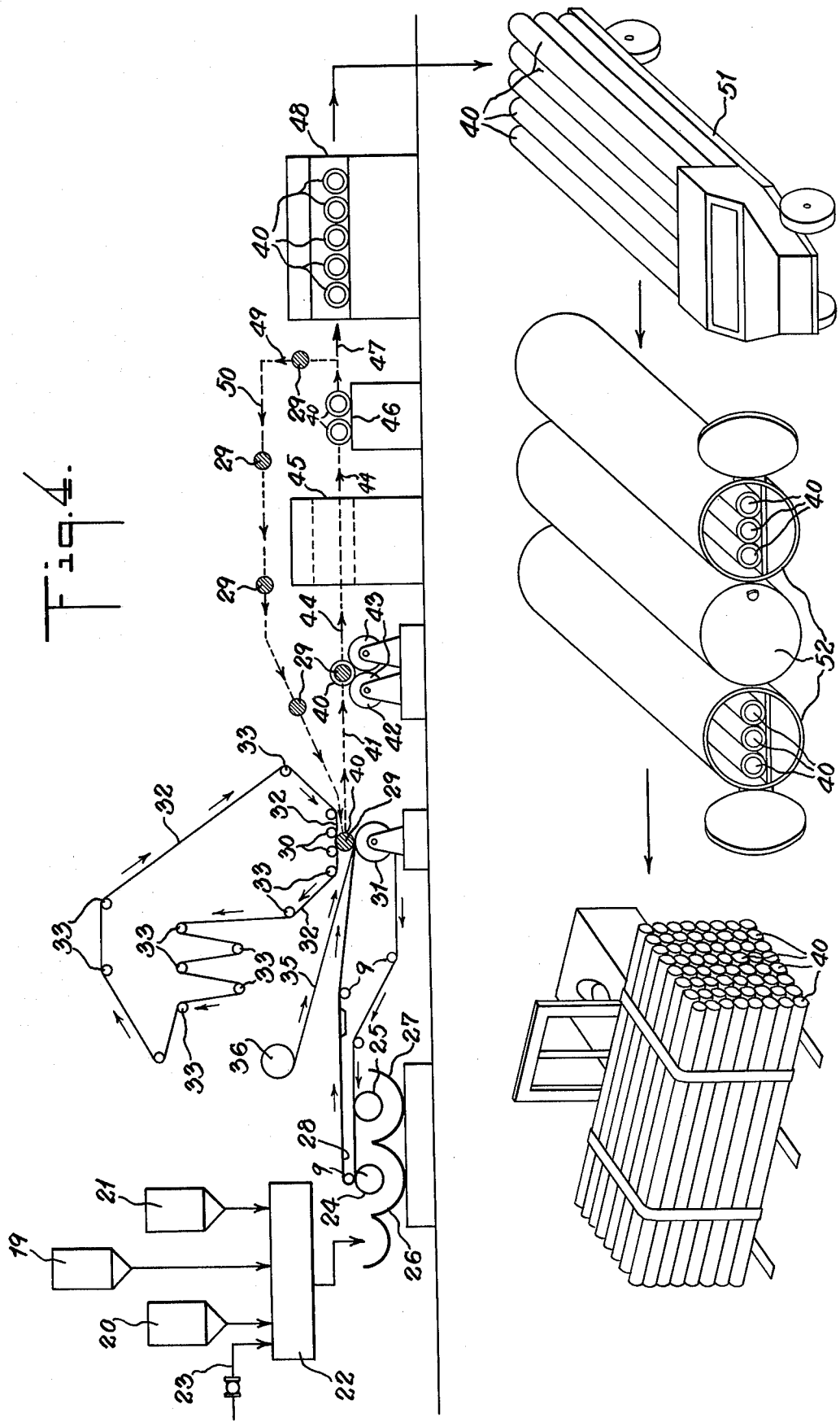

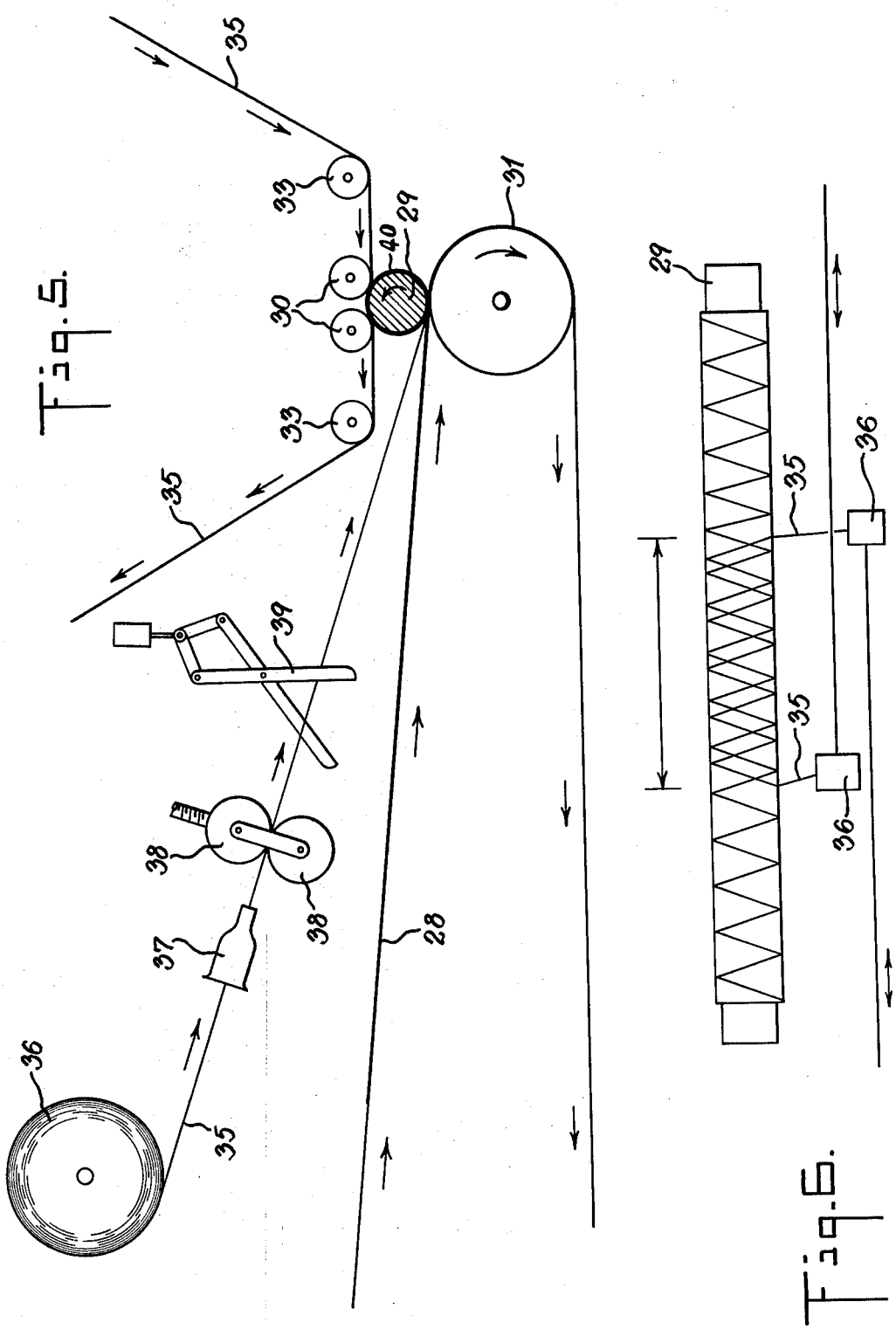

NON-STRESSED, HIGH STRENGTH, CEMENT-CONTAINING PIPE AND ITS PRODUCTION

BACKGROUND OF THE INVENTION

1. Field of the Invention

This invention relates to non-stressed, reinforced cement-containing pipe and more particularly to non-stressed, reinforced, high strength, cement-containing pipe, especially asbestos-cement pipe characterized by high bursting strength and high flexural strength, and a method for producing such pipe.

2. Description of the Prior Art

U.S. Pat. No. 3,631,897 and 3,813,098 disclose stressed concrete or asbestos-cement pipe and other tubular articles wherein tensioning strands of nylon, polyester or polypropylene are wrapped or wound around the surface of the pipe and tubular article and are stretched to a length at least 5% greater than its stable, relaxed length. The material of the strands is fixed in its stretched or elongated condition around the pipe and tubular article, and the material of the strands fixed around the pipe and tubular article is in tension in an amount of 15% or more of its ultimate breaking strength. U.S. Pat. Nos. 2,251,205; 2,375,971 and 2,711,291 disclose concrete pipe having metal wire, such as steel wire, wound around the pipe to reinforce it. U.S. Pat. No. 2,791,241 relates to fibrous reinforced resin pipe comprising a first series of long reinforcing fibers of glass or asbestos helically wound at a helix angle of from 2° to 10°, and a second series of the aforementioned long reinforcing fibers superposed on the first series of helical winding and helically wound with a helix angle of from 80° to 88°. A cured resin secures the fibers together to form an integral pipe.

An important application of asbestos-cement pipe of the prior art consisting of asbestos fiber, cement and silica has been for conveying or conducting water under pressure. Cast iron pipe is also utilized in the prior art for conducting water under pressure. The cast iron pipe may require the installation of a sacrificial or impressed current cathodic protection system, not required by asbestos-cement pipe, to obviate corrosion of the iron pipe. The cathodic protection requirement adds materially to the cost of the cast iron pipe. Further, there is room for improvement of the bursting strength, as well as the flexural strength, of the aforementioned prior art asbestos-cement pipe.

BRIEF SUMMARY OF THE INVENTION

In accordance with the present invention, a non-stressed, reinforced, high strength, inflexible or substantially inflexible, rigid, cement-containing pipe is provided which comprises an inflexible or substantially inflexible, rigid, tubular article body of a cured composition containing a hydraulic cement, for example a composition containing cement, asbestos fiber and silica, and a plurality of windings of a continuous filament of aromatic polyamide fiber of high tensile strength and a low elongation capability about one or more layers of the cement-containing composition within the interior of the pipe without or substantially without being stretched. The continuous filament is characterized by not being or substantially not being in tension, and having its normal length, and the continuous filament is maintained about the one or more cement-containing composition layers within the pipe interior without being stretched and substantially without being in tension.

The continuous filament of aromatic polyamide fiber is usually wound and maintained taut about the one or more layers of cement-containing composition within the interior of the pipe. By "taut" as used herein in referring to the windings of continuous filament of the aromatic polyamide fiber about one or more layers of the cement-containing composition within the interior of the pipe is meant that the continuous filament of aromatic polyamide fiber is tightly or substantially tightly wound about the cement-containing layer or layers without any slack or substantially any slack in such filament.

Non-stressed asbestos-cement pipe of the present invention is characterized by providing a striking improvement in hydrostatic bursting strength and a considerably higher hydrostatic bursting strength than the hydrostatic bursting strength of the prior art asbestos-cement pipe which is not reinforced with a continuous filament or strand. Non-stressed asbestos-cement pipe of this invention is also characterized by exhibiting a considerable improvement in flexural strength. In hydrostatic bursting strength tests, non-stressed asbestos-cement pipe of this invention withstood hydrostatic pressure as great as 1100 psi, which was about 110% above the hydrostatic bursting strength required by the A. W. W. A. to be withstood by the pipe. In flexing strength tests, non-stressed asbestos-cement pipe of this invention attained a flexing strength which was as much as 37% above the flexing strength required by the A. W. W. A. to be withstood by the pipe.

Strength tests conducted on the non-stressed high strength asbestos-cement pipe of this invention indicate that such pipe is well adapted for use in conveying or conducting water under considerably higher pressures than the prior art asbestos-cement pipe is capable of. Further, an additional margin of safety is achieved in the pipe of the present invention destined for use in conveying water under roads or streets due to the continuous filament windings of the KEVLAR fiber, the pipe under roads or streets tending to be subjected to certain extreme conditions of heavy vibration, heavy weight, or beam conditions.

The aromatic polyamide fiber of the continuous filament utilized in the present invention which is obtainable as KEVLAR fiber or filament, has high tensile strength of at least about 390,000 psi and a low elongation capability of no more than 7%. This aromatic polyamide fiber usually has a high tensile strength in the range of about 400,000 psi to about 525,000 psi and preferably a very low elongation capability in the range of about 2% to about 4%. The preferred KEVLAR 49 aromatic polyamide fiber for use herein has a very high tensile strength in the range of about 520,000 psi to about 525,000 psi and a very low elongation capability within the elongation capability range of about 2% to about 4%. By the term "elongation capability" as utilized herein and in the appended claims is meant the maximum or substantially maximum length to which the fiber can be elongated from its stable relaxed length. Thus, for example, an elongation capability of 7% means that the fiber can be elongated to a maximum length which is 7% greater than its stable, relaxed length; and an elongation capability of about 2% means that the fiber can be elongated to a maximum length which is about 2% greater than its stable relaxed length.

The continuous filament of KEVLAR fiber utilized herein can be, for example, yarn, roving, or woven fabric usually of narrow width or in strip form with the strip being of width, for example, of typically about ¼ - 1 inch. Conceivably the continuous filament of KEVLAR fiber can also be rope, or non-woven mat or fabric of KEVLAR fiber of narrow width or in the form of strip as disclosed immediately above. The KEVLAR yarn is utilizable in a wide range of deniers of, typically, 195 through 1420. By "continuous filament" as utilized herein and in the appended claims is meant a filament of KEVLAR fiber of considerable length, ordinarily of a plurality of feet in length, and usually of many feet or numerous feet in length as contrasted with short, discrete, fibers of asbestos of typical length of 1¼ inch or other short, chopped filler of similar short length.

The KEVLAR fibers utilized in this invention have a high strength-to-weight ratio and are unequalled in the category of high-tenacity of high tensile strength organic fibers; with KEVLAR fiber having very high tensile strength which is more than twice as great as that of a representative nylon yarn of the comparable weight and considerably greater than that of Dacron polyester and polypropylene fiber. The striking superiority in tensile strength of KEVLAR 49 fiber over that of typical nylon, Dacron and polypropylene fibers is set forth hereafter:

|  | Tensile Strength |
| --- | --- |
| KEVLAR 49 aramid fiber | 500,000 psi |
| Nylon type 728 | 140,000 psi |
| Dacron T-68 | 160,000 psi |
| Polypropylene | 94,000 psi |

The nylon type 728 was an aliphatic polyamide.

A representative high strength aliphatic polyamide nylon yarn has a tenacity of approximately 10 grams per denier; KEVLAR yarn in a comparable weight has a tenacity of over 22 grams per denier and other KEVLAR yarns have tenacities in excess of 25 grams per denier.

Further, KEVLAR fiber has good to excellent dimensional stability due to its high or intermediate modulus and low elongation, light weight, good temperature resistance and showing good heat and fire resistance. The preferred KEVLAR 49 yarn for use herein has a density of 1.45 g/cc, which is 40% lower than glass; fiber elongation of 2.8% which is significantly lower than the fiber elongation of other organic fibers; tensile strength of 525,000 psi, which is considerably above the tensile strength of conventional organic fibers; modulus of $19 \times 10^6$ psi, which is twice that of E-glass; good chemical resistance, -being highly resistant to organic solvents, fuels and lubricants; and excellent temperature resistance with no degradation of the yarn properties in short exposures up to temperature of 500° F. The KEVLAR 29 yarn, also utilizable herein, has a density of 1.44 g/cc, break elongation of 3-4%, tensile strength of 400,000 psi, modulus of $9 \times 10^6$ psi, and excellent temperatures resistance having useful properties over a wide range of temperatures from subzero to high temperatures, specifically from −420° F. to 500° F.

The aromatic polyamide from which KEVLAR fiber is spun is reported to be prepared by reacting an aromatic dicarboxylic acid, such as terephthalic acid or anhydride, and an aromatic diamine such as p-phenylene diamine. Alternatively, the aromatic polyamide may be an aromatic aminocarboxylic acid such as, for example, 4-aminobenzoic acid. The aromatic polyamides have been assigned the generic classification "aramid" by the Federal Trade Commission.

It is critical that the continuous filament of aromatic polyamide fiber utilized in the present invention not be placed or maintained in tension during the production of the pipe. The reason for this is that the asbestos-cement is of plastic consistency and relatively soft, and the concrete may be only partially cured and also relatively soft at the time such continuous filament is wound about the asbestos-cement layer or layers, or concrete layer or layers, and if the continuous filament was placed and maintained under significant tension at the time of winding, the continuous filament would cut into the soft asbestos-cement or concrete and could cut all the way through the soft asbestos-cement or concrete to the mandrel. In either case, the cut asbestos-cement pipe or cut concrete pipe would be damaged and undoubtedly damaged to such an extent as to render it unmarketable. The continuous filament of aromatic polyamide fiber of the high strength cementitious pipe of this invention may be placed in a certain amount of tension during use of the pipe when the pipe is subjected to certain stresses, for example, flexural stress when buried under roads or streets due to the weight of automobiles.

It is important that the aromatic polyamide fiber utilized herein have a low elongation capability not above 7%, for the reason that if such fiber had an elongation capability significantly above 7%, which is the situation with highly elastic fibers such as aliphatic polyamide nylons, "Dacron" polyester and polypropylene fibers, the reinforced pipe would undoubtedly not have the strength that the pipe has when reinforced with the continuous filament of the aromatic polyamide having the lower elongation below 7% or at least not above 7%. The reinforcing filament of the fiber having the higher elongation capability significantly above 7% would tend to stretch when the pipe reinforced therewith is subjected to material stress, and for this reason the reinforced pipe would not be as strong as when reinforced with the continuous filament of KEVLAR aromatic polyamide fiber having the lower elongation capability below 7% or at least not above 7%.

The plurality of windings of the continuous filament within the pipe interior can be wound manually or by conventional winding apparatus over the entire length or substantially the entire length of the pipe, over a major portion, i.e. 50% or more, of the length of the pipe, over a minor portion, i.e. less than 50%, but an appreciable portion of the length of the pipe, over a central portion, for instance an intermediate one-third, of the length of the pipe, or over another portion of the length of the pipe. The windings are ordinarily helical windings and can be a single layer of windings of typical helix angle of 50° or two or more superposed layers of windings around one or more of the asbestos-cement or concrete layers, with the helix angle of one of the layers of such windings usually being different than the helix angle of another layer of helical windings of such continuous filament superposed directly thereon, for example, a helical winding in one direction having an acute helix angle of typically 50° and a helical winding in the opposite direction having an obtuse helix angle of typically 120°.

The method of this invention for producing the non-stressed, reinforced cementitious or cement-containing pipe comprises forming a tubular article body comprising a plurality of superposed layers of a composition comprising a hydraulic cement and water, and winding a continuous filament of the aromatic polyamide fiber previously disclosed herein, and obtainable as KEVLAR aramid fiber, about one or more of such cement-containing layers usually while wet and uncured or only partially cured within the interior of the pipe during or after the formation of the cement-containing layer and before the formation of the next succeeding, complete, cement-containing layer thereon. The continuous filament of the aromatic polyamide fiber is characterized by having the high tensile strength and low elongation as well as the other properties previously disclosed herein. The thus-obtained pipe is cured. The method herein is eminently well adapted for producing asbestos-cement pipe for conveying water under high pressure. This method is also utilizable for producing concrete pipe for draining purposes or "so called" culvert pipe.

More specifically, in the method of the present invention for producing the non-stressed, high strength asbestos-cement pipe, a water-laid, wet asbestos-cement sheet is formed from an aqueous asbestos fiber-cement slurry, and water is removed from the wet asbestos-cement sheet. The partially dewatered, still wet sheet is wound up on a pipe-forming mandrel as a plurality of spirally wound, wet asbestos-cement layers thereon while applying pressure to the wet asbestos-cement sheet on the mandrel. A continuous filament, e.g. yarn, of the aromatic polyamide fiber previously disclosed herein, and obtained as KEVLAR aramid fiber, is wound, usually by helical winding and usually taut, about one or more of the spirally wound, wet asbestos-cement layers within the interior of the ultimate pipe on the mandrel during the winding of the wet asbestos-cement layers on the mandrel without any or substantially any slack in the continuous filament, without any or substantially any stretching of the continuous filament and without placing the continuous filament in tension. The continuous filament of the aromatic polyamide fiber is characterized by having the high tensile strength, low elongation, and the other properties previously disclosed herein. The mandrel is separated from the inner surface of the pipe, the pipe is ordinarily precured, the mandrel extracted from within the pipe, and the precured pipe is subsequently cured to a fully-cured or substantially fully-cured state. One spirally wound asbestos-cement layer of the pipe is one complete revolution of an asbestos-cement layer of the pipe.

The asbestos-cement pipe is ordinarily precured subsequent to separating the mandrel from the pipe inner surface, and prior to extracting the mandrel from within the pipe. The precuring is carried out for a period sufficient to render the asbestos-cement pipe sufficiently rigid or self-sustaining to enable the mandrel to be extracted from the pipe without disintegration of the pipe. The precuring and curing of the asbestos-cement pipe is ordinarily and preferably carried out by subjecting the pipe to heating at elevated temperature in an atmosphere having a high moisture content or high relative humidity, such precuring and curing being known and conventional in the art. The curing can be also accomplished by immersing the asbestos-cement pipe in water for 28 days, but this is not preferred.

In producing the high strength asbestos-cement pipe herein, the wet asbestos-cement sheet is ordinarily formed by one or more, typically two, rotating sieve cylinders partially immersed in the aqueous asbestos-cement slurry, the sieve cylinder picking up the slurry as a water-laid, thin, wet asbestos-cement sheet or web on its sieve surface, with water being removed from the wet asbestos-cement sheet on the sieve cylinder surface by being forced through the sieve openings of the sieve cylinder. The still wet asbestos-cement sheet is transferred from the rotating sieve cylinder onto a moving, continuous, water-permeable member, usually a felt, and the asbestos-cement sheet is transported on the moving, permeable member to the pipe-forming mandrel for winding thereon while additional water is removed from the asbestos-cement sheet furing its transport on the mandrel.

The continuous filament can be wound about the asbestos cement layer or layers, or about the concrete layer or layers, in the interior of the pipe, about its entire length or substantially its entire length, about a major portion, i.e. 50% or more of its length, about a minor portion i.e. less than 50%, of its length, but an appreciable portion of its length, over a central portion of its length, or over another portion of its length. The windings, which are usually helical windings, can be a single layer of windings or one or more superposed layers of windings, with the helical angle of one of the layers of such windings usually being different than the helical angle of another layer of helical windings superposed directly thereon.

The aromatic polyamide-reinforced concrete pipe of this invention can be produced, in accordance with one method, by casting the concrete in a steel pipe mold having a steel cylindrical mandrel disposed and secured therein and with the mold cavity having a width equivalent to about ½ the radial thickness desired in the wall of the ultimate pipe when two concrete layers are to be cast in forming the pipe. When more than two concrete layers, for example three or four concrete layers, are desired in the wall of the ultimate pipe the mold cavity has a width equivalent to about ⅓ or ¼ respectively of the radial thickness desired in the wall of the ultimate pipe. After a concrete layer is cast, the cast concrete in the mold is precured or allowed to partially harden in conventional and known manner, for instance in ambient air, for a period sufficient to render the cast concrete self-sustaining when the outer mold casing is removed, and thereafter the outer mold casing is removed to expose and render accessible the cast concrete layer, which still may be relatively soft concrete due to being only partially cured and hence only partially hardened, on the mandrel. The continuous filament of the KEVLAR aramid fiber having the characteristics of high tensile strength and low elongation as well as the other properties previously disclosed herein is then wound manually or by conventional winding apparatus, ordinarily by helical winding, and usually taut, around the concrete layer without any or substantially any stretching of the filament and without any or substantially any tensioning of the filament. The continuous filament windings of KEVLAR aramid fiber are maintained about each concrete layer by tying the filament to itself on the concrete layer by a suitable, strong knot which is the means maintaining the continuous filament windings about the one or more cement-containing or concrete layers within the pipe interior. An outer mold casing of larger diameter than the first-mentioned mold casing and of sufficient or corresponding diameter to provide a second concrete layer of the desired thickness is then disposed in proper position about the mandrel and another concrete layer cast over the continuous filament windings of KEVLAR aramid fiber and the first concrete layer. If only two layers of concrete are desired in the pipe, after removal of the mandrel, the pipe is cured in conventional manner in an autoclave under steam and pressure or, if desired, in ambient air. When more than two concrete layers are desired in the pipe, the continuous filament of KEVLAR aramid fiber is again wound, ordinarily by helical winding and usually taut, around the second layer of concrete. The continuous filament windings of the KEVLAR aramid fiber are maintained or secured about each concrete layer by tying the filament to itself on the concrete layer by a suitable strong knot. This sequence of casting concrete layers and winding the continuous filament of KEVLAR aramid fiber about the cast concrete layer is repeated until the desired number of concrete layers are cast about the mandrel, provided however that the continuous filament of KEVLAR aramid fiber is ordinarily not wound around the last concrete layer, and hence there ordinarily are no exposed continuous filament fibers on the outermost exposed main surface of the product pipe.

The concrete can also be produced by centrifugal casting the concrete layers on the mandrel in conventional manner, followed by winding the continuous filament of KEVLAR fiber about each concrete layer in the manner disclosed previously herein.

The present invention can be utilized with any method for producing a plural layer asbestos-cement pipe or concrete pipe so long as the method enables the winding of the continuous filament of KEVLAR aromatic polyamide fiber about the asbestos-cement or concrete layer or layers as desired.

The continuous filament of KEVLAR aromatic polyamide fiber is usually untreated filament when wound about the asbestos-cement or concrete layer or layers herein in producing the high strength pipe. However, such filament could be treated, if desired, prior to such winding, by being, for example, precoated with a silica gel or asbestos-cement slurry.

BRIEF DESCRIPTION OF THE VIEWS OF THE DRAWINGS

FIG. 2 is a side elevational view partly broken away showing a length or non-stressed, high strength asbestos-cement pipe of the present invention;

FIG. 3 is a longitudinal view partly broken away showing a length of non-stressed, high strength concrete pipe of this invention;

FIG. 4 is a flow diagram illustrating apparatus utilized in producing non-stressed, high strength asbestos-cement pipe of the invention;

FIG. 5 is a schematic, fragmentary view showing apparatus for winding the cintinuous filament of aromatic polyamide fiber within the asbestos-cement pipe during formation of such pipe on the pipe machine; and FIG. 6 is a schematic, fragmentary view showing moveable bobbins of the filament winding apparatus for winding the continuous filament of aromatic polyamide within the asbestos-cement pipe during formation of such pipe on the pipe machine mandrel.

DETAILED DESCRIPTION

Figure 1:
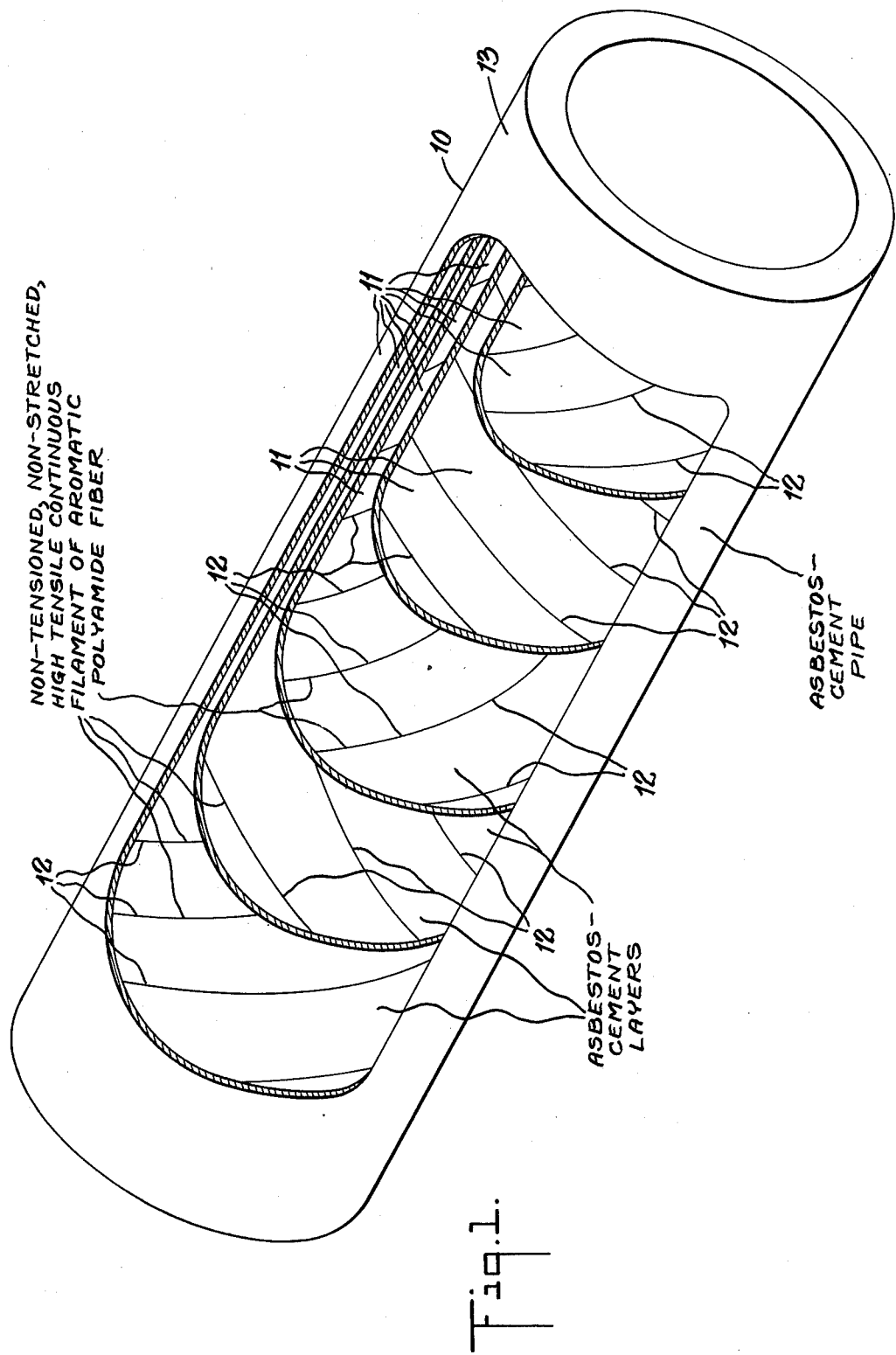
FIG. 1 is an isometric view partly broken away showing a length of non-stressed, high strength asbestos-cement pipe of the present invention.

With reference to FIGS. 1 and 2, asbestos-cement pipe 10 comprises a plurality of convolutely wound up and compressed asbestos-cement layers 11, and a plurality of windings 12 of a continuous filament yarn of an aromatic polyamide fiber known as KEVLAR fiber characterized by having a very high tensile strength of about 395,000 psi or higher which is considerably above the tensile strength of prior art organic polymer fibers such as nylon, Dacron polyester and polypropylene, a high stretch resistance as evidenced by a low elongation capability of no more than 7% and preferably in the range of about 2% to about 4% which is a significantly lower fiber elongation than that of the prior art nylon, Dacron polyester and polypropylene fibers, and also having the other properties previously disclosed herein. The continuous filament yarn 12 of KEVLAR fiber is compressed flat or substantially flat, or oblong or substantially oblong, between the asbestos-cement layers 11 as shown in FIG. 2, during the formation of the pipe on the pipe-forming mandrel, with the cement being forced or dispersed between the fibers of yarn 12. The cement hardens between the yarn fibers with the result the yarn 12 and its fibers are bonded within the pipe by the hardened cement. The "KEVLAR" fiber is obtained from E. I. duPont deNemours & Co., Textile Fibers Department, Wilmington, Del. 19898. The outermost exposed main surface of pipe 10 is free of the continuous filament.

As shown in FIG. 1, the windings 12 of the continuous filament yarn of KEVLAR fiber are a helical winding around each of the asbestos-cement layers exclusive of the outer-most asbestos-cement layer 13, with the windings being at different helix angles, and in different directions in succeeding layers 11.

Referring to FIG. 3, concrete pipe 15 comprises a plurality of separate, concentric layers 16 of concrete, and a plurality of windings 17 of a continuous filament yarn of the aromatic polyamide fiber known as KEVLAR fiber characterized by having the high tensile strength, low elongation capability, and other properties previously set forth herein. The windings 17 of the continuous filament yarn of KEVLAR fiber are a helical winding around each concrete layer excluding the outermost layer, with the helical windings being at different helical angles and in different directions in succeeding layers.

Referring now to FIG. 4, asbestos fibers, cement and ordinarily also silica flour are supplied from hoppers 19, 20 and 21 respectively into vat 22, and alkaline water is fed through line 23 into vat 22. The asbestos fibers, cement, silica flour and water are mixed together in vat 22 to form an asbestos cement slurry. As exemplary, a cement of a certain type well known in the art for use in producing asbestos-cement pipe and silica flour are supplied into vat 22 in the proportions by weight, of 60% of the cement and 40% of the silica. The asbestos fiber, which is typically a mixture of long crysotile fiber and long crocidolite fiber is supplied into vat 22 in amount, by weight, of about 15% of the total weight of the cement plus the silica. Water, which has been previously made alkaline, is fed into vat 22 in amount sufficient to make a suitable slurry of consistency well known in the art of asbestos-cement pipe manufacture. The temperature of the thus-formed asbestos-cement slurry in vat 22 is typically about 105° F. Sieve cylinders 24 and 25 of typically 40 mesh are partially immersed in and rotate counter-clockwise in the asbestos-cement slurry in vats 26 and 27 to pick up the slurry as a thin wet sheet of asbestos-cement on the sieve cylinders, the water being forced out of the wet asbestos-cement sheets through the sieve openings of the cylinders. Felt 28 moving on felt-carrying rolls 9 picks up the wet sheet from cylinders 25 and 24 and carries the asbestos-cement sheet to pipe-forming mandrel 29. Additional water is removed from the wet asbestos-cement sheet on porous felt 28 by a partial vacuum applied thereto by a vacuum box (not shown). The wet asbestos-cement continuous sheet of reduced water content is wound up on mandrel 29 while under considerable pressure applied by press rolls 30 and supported by breast roll 31. Mandrel 29, press rolls 30, and breast roll 31 are steel rolls. Felt 32, which is pressed directly against the wet asbestos-cement pipe being formed on mandrel 29 by the press rolls, functions to further dewater the asbestos-cement pipe being formed on mandrel 29. Felt 32 runs over felt-carrying rolls 33 and vacuum boxes which remove water from felt 32.

While the wet asbestos-cement sheet is being wound up on pipe-forming mandrel 29, continuous filament 35 of "KEVLAR" aromatic polyamide fiber of high tensile strength in the range of about 395,000 psi to about 530,000 psi, and high stretch resistance as shown by a low fiber elongation capability of no more than 7% is helically wound taut, but without stretching, from bobbin 36, also shown in FIG. 5, around each of the plurality of asbestos-cement layers being wound up on mandrel 29 and within the interior of the thus-forming pipe. As shown in FIG. 5, continuous filament 35 of KEVLAR fiber passes from bobbin 36 through guide 37, power feed rolls 38, and between the blades of automatic shear 39 prior to being helically wound on the asbestos-cement layers on mandrel 29. Shear 39 cuts the continuous filament 35 to the desired length of such filament for helically winding on the asbestos-cement layers on mandrel 29. The windings of such continuous filament are maintained taut or substantially taut about the asbestos-cement layers within the interior of the pipe substantially without being stretched and substantially without being in tension by means of the asbestos-cement layers superposed directly on such windings. With reference to FIG. 6, two or more bobbins 36 are employed, with each bobbin oscillating back and forth and applying a helical winding of the continuous filament 35 of KEVLAR fiber over more than 50% of the length of the asbestos-cement layers, exclusive of the outermost asbestos-cement layer, from the opposite ends thereof on the mandrel 29, with overlapping on the central portion of the asbestos-cement layers.

Referring again to FIG. 4, mandrel 29 and asbestos-cement pipe 49 thereon are conveyed as a unit by chain conveyor 41 to calendar 42 comprising 2 rotatable steel rolls 43 whereon the asbestos-cement pipe 40 is separated from the mandrel 29. An operator ordinarily starts the separation of the asbestos-cement pipe from the mandrel with a tool at the end portion of the pipe, and the action of the rotating rolls 43 of the calender results in the asbestos-cement pipe being separated from the steel of the mandrel over the entire length of the asbestos-cement pipe. The mandrel 29 with separated pipe 40 still thereon is conveyed by chain conveyor 44 to moist heat oven 45 for precuring. The temperature in oven 45 is typically about 250° F. and the relative humidity therein is typically about 95–100% and the mandrel with separated asbestos-cement pipe thereon is kept in oven 45 typically about one hour and fifteen minutes. The heat and moisture in oven 45 is believed to accelerate certain reactions occurring in the cement of asbestos-cement pipe 40 whereby, upon removal of the mandrel 25 and pipe 40 from the oven 45, the asbestos-cement pipe 40 has sufficient rigidity and strength to enable mandrel 29 to be removed from the pipe 40.

After removal of mandrel 29 and pipe 40 from oven 45, the mandrel and pipe are conveyed to mandrel extractor 46 by chain conveyor 44. The mandrel 29 is manually removed from the asbestos-cement pipe 40 at extractor 46, and pipe 40 is then manually transferred to another chain conveyor 47. Pipe 40 is conveyed by conveyor 47 into another moist heating oven 48, and pipe 40 is held in oven 48 at temperature of typically about 120° F. and relative humidity of typically about 60–70% for about 1¼ hours. The removed mandrel 29 is carried by elevator 49 to another chain conveyor 50 which returns mandrel 29 and usually also other mandrels that have been removed at mandrel extractor 46 to the pipe forming machine.

Pipe 40 is removed from oven 48 after typically about 1¼ hours and is loaded usually together with other asbestos-cement pipes removed from oven 48 onto a tray. The trays having the thus-formed asbestos-cement pipe 40 are then transferred by transporting vehicle 51 to autoclaves 52 and inserted into the autoclaves. The doors of autoclaves 52 are then closed and the asbestos-cement pipes are fully cured in autoclaves 52 under the following conditions: steam pressure is built up gradually to 125 psi over about 1–1½ hours and such steam pressure maintained an additional 12–16 hours; temperature is about 350° F. at such steam pressure. The asbestos-cement pipe 40 are then removed from autoclave 52 as fully cured asbestos-cement pipe. The ends of the fully cured pipe are then machined at machining apparatus to the desired configuration, usually as a spigot end onto which a "Permaflex" coupling is installed. Prior to shipping such pipe, it is subjected to flexural testing and internal pressure hydrostatic testing.

The pipe-forming machine shown diagrammatically in FIG. 4 is a conventional asbestos-cement pipe machine obtainable in commerce. We obtained such asbestos-cement pipe machine from J. M. Voith A.G., A-3100 Street, Polten, Austria.

Tests were conducted wherein measured lengths of continuous filament of KEVLAR 49 aramid fiber of three different deniers were intermittently wound into the asbestos-cement wall of asbestos-cement pipes during formation of the pipe on the mandrel of the pipe-forming machine during normal pipe production cycles. The continuous filament of KEVLAR 49 aramid fiber was fed by hand with only sufficient tension on the filament to prevent any slackness. Inasmuch as 16 inch Class 150 asbestos-cement pipe was being produced at the time of the tests and as the weakest point in the pipe of this size was in the hydrostatic pressure tests with the primary fracture consistently being in the center or approximate center of each 13 foot length, the winding of the continuous filament of KEVLAR 49 aramid fiber was concentrated in the center or intermediate area of the pipe. The hydrostatic pressure tests were conducted in accordance with ASTM test method C-500, and the flexural or flex tests were conducted in accordance with ASTM test method C-500. In the tests and test results hereinafter set forth, the language "required" pressure or pressure "required" means the hydrostatic pressure or flexural pressure required by the A.W.W.A., i.e. the American Water Works Association, to be withstood by the asbestos-cement pipe. The language "close weave" referred to in the tests and test results means the continuous filament was helically wound into the pipe with the continuous filament of the helical windings being adjacent and/or touching each other and without any large gaps between the helical windings. The language "open spiral weave" referred to in the tests and test results means the continuous filament was helically wound into the pipe with the continuous filament of the helical windings being spaced an appreciable distance apart and not being adjacent or contacting each other.

The considerable improvement in bursting strength provided by the pipe of the present invention containing the internally wound continuous filament of KEVLAR fiber over the conventional pipe not containing the continuous filament of KEVLAR fiber is shown hereinafter by the test results of Test Nos. 1, 2, 3, 4, 5, 6 and 7 as compared with the hydrostatic bursting strength results for such conventional pipe not containing the continuous filament reported hereinafter in the "Results" portion of Test No. 6. The excellent flexural strength provided by the pipe of this invention containing the internally wound continuous filament of KEVLAR fiber is shown hereinafter by the test results of Test Nos. 8, 9, 10, 11 and 12. Striking increases in hydrostatic bursting strength representing over 200% of the required hydrostatic bursting strength were achieved by pipe of the present invention containing the internally wound continuous filament of KEVLAR aromatic polyamide fiber, as shown hereinafter by the test results of Test No. 4. Considerable increases in flexural strength of about 35% or more above the required flexural strength or "load" were attained by pipe of the present invention containing the internally wound continuous filament of KEVLAR fiber, as is shown hereinafter by the test results of Test Nos. 9 and 11.

TEST NO. 1

Lengths of each of denier 195, 390 and 1424 of continuous filament of KEVLAR 49 aramid fiber were wound into the center of different asbestos-cement pipe beginning with the first or second asbestos-cement layer of each pipe and continuing until the full length was used. 184' of 195 denier, 92' of 380 denier and 24' of 1424 denier continuous filament were wound into the different asbestos-cement pipes. A simple spiral wrap was used with no attempt at weaving.

Results

Pipe #1 which contained 184' of 195 denier withstood the hydrostatic pressure test up to 540 psi and failed at 540 psi.

Pipe #2 which contained 92' of 380 denier withstood the hydrostatic pressure test up to 500 psi and failed at 500 psi.

Pipe #3 which contained 48' of 1424 denier withstood the hydrostatic pressure test up to 490 psi and failed at 490 psi.

TEST NO. 2

Variations of spiral weaving of unmeasured amounts of each of denier 195, 380 and 1424 of continuous filament of KEVLAR 49 aramid fiber were used. Beginning in the center of each 16 inch Class 150 pipe, the continuous filament was fed by hand moving toward one end and continuing toward the opposite en and returning to the center.

Results

Pipe #1 contained 1424 denier. The continuous filament was added from the center to the drive side end and back to the operator's side but the continuous filament had to be cut before returning to the center. This resulted in the pipe being double wound in one end and only singularly wound in the other. The pipe did not burst in the hydrostatic pressure test until 540 psi and it was noted that the pipe split only from the center back to the side that contained only one strand.

Pipe #2 contained 380 denier continuous filament of KEVLAR 49 aramid fiber and did not burst in the hydrostatic pressure test until 550 psi.

Pipe #3 contained 195 denier continuous filament of KEVLAR 49 aramid fiber and did not burst in the hydrostatic pressure test until 525 psi.

Pipe #4 contained 195 denier continuous filament of KEVLAR 49 aramid fiber and did not burst in the hydrostatic pressure test until 540 psi.

Three of these four pipes passed the required 525 psi. Also worth noting is that none of the pipe split the full length of the pipe when they burst, which is the normal type break in large diameter pipe.

TEST NO. 3

Again concentrating on the center section of the asbestos-cement pipe, all three diameters or deniers of continuous filament of KEVLAR 49 aramid fiber were woven over varying lengths of the center of the pipe.

Results

Pipe #1 had 195 denier continuous filament of KEVLAR 49 aramid fiber woven over the middle three feet moving from center left approximately 18 inches and wrapping at this point for 10 layers before moving to the right 18 inches past center, hesitating for 10 layers and then back to center for 10 layers. This was continued for the full 110 layer count. This pipe was tested in the hydrostatic pressure tests first at 500 psi, then at 545, 565, 650, 650, 650 psi and finally 685 psi before bursting. Again, this pipe did not split from end to end but had a u-shaped crack from the edge of the application area back.

Pipe #2 was woven in the manner of #1 with the 195 denier continuous filament of KEVLAR 49 aramid fiber being confined to the center 2 feet. This pipe was tested in the hydrostatic pressure tests at 500 psi, 650 psi and 760 psi before bursting.

Pipe #3 was woven the same as #2 but using 380 denier continuous filament of KEVLAR 49 aramid fiber. This pipe was tested twice at 650 psi and did not burst until 690 psi.

Pipe #4 was woven in the manner of above but using 1424 denier continuous filament of KEVLAR 49 aramid fiber and confining it to the middle 18 inches of the pipe. This pipe was tested in the hydrostatic pressure tests at 530, 590, 600 and 650 psi and did not burst until 700 psi.

None of these pipe split from end to end upon failure in the hydrostatic tests. As 80% of all 16 inch Class 150 asbestos-cement pipe produced on the day prior to the tests and 20% of all 16 inch Class 150 asbestos-cement pipe produced on the same day without the incorporation therein of the continuous filament of KEVLAR 49 aramid fiber by winding into the pipe had to be reclassified to a T/50 classification due to not having sufficient strength to withstand hydrostatic pressure testing of even 525 psi, the test results show the considerable improvement in strength by winding the KEVLAR 49 aramid fiber into the pipe. The test results indicated that a close weave in the center area of the pipe is superior to just an open spiral weave over the full length of the pipe.

TEST NO. 4

This was a multi-purpose test on 4 inch Class 150 asbestos-cement pipe since all pipe 4 through 8 inches in diameter must withstand both a hydrostatic pressure test as well as a flexural test. Thirteen asbestos-cement test pipes were made and stripped on the mandrel of the pipe machine.

Results

Pipes #1, #2 and #3 were woven with an open spiral weave in the middle three feet of each pipe for the duration of roll-up using 195 denier continuous filament of KEVLAR 49 aramid fiber. All three passed the required 134 psi gauge pressure or 1100 lb applied load of the flexural test. Pipe #1 was subjected to 140 psi in the flexural test and broke 7 feet-8 inches from the D/S end which was just at the edge of the application area. Pipe #2 and #3 were then subjected to hydrostatic pressures beginning at the required 525 psi and continuing in 50 lb increments until pipe #2 broke at 1000 psi, breaking on the D/S end only. Pipe #3 burst at hydrostatic pressure of 990 psi on the O/S end. Both broke outside the application area.

Pipes #4 and #5 were woven as close as possible to the previous three but using 380 denier continuous filament of KEVLAR 49 aramid fiber. Both pipes passed the required 134 psi gauge pressure of the flexural test with pipe #5 withstanding an additional flexural test at 140 psi. Again both pipes were hydrostatically tested beginning at 525 psi and continuing until pipe #4 burst at 880 psi hydrostatic pressure and pipe #5 burst at 600 psi. Both broke on the O/S end and outside the application area.

Pipes #6 and #7. The continuous filament was applied as in pipe above but using 1424 denier continuous filament of KEVLAR 49 aramid fiber. Both pipes passed the required 134 psi gauge pressure of the flexural test. Pipe #6 was subjected to an additional flexural test of 140 psi and broke at 7 feet-9 inches from the D/S end — again in the edge of the application area. Pipe #7 was hydrostatically tested beginning at 525 psi and continuing to 880 psi. This pipe did not burst and was held for further tests.

Pipes #8 through #13 were woven beginning in the center for three layers, moving 1 foot-6 inches to the left and pausing for three layers, moving to the right for 3 feet-0 inches and pausing for three layers and returning to the center for the duration. Pipe #8 contained 1424 denier continuous filament of KEVLAR 49 aramid fiber and passed the required 134 psi gauge pressure flexural test, and broke during an additional flexural test at 150 psi 5 feet-10 inches from D/S end.

Pipes #9 and #10 contained 380 denier continuous filament of KEVLAR 49 aramid with both passing the required 134 psi gauge pressure flexural test with #9 failing the additional flexural test at 140 psi and breaking 7 feet-7inches from the D/S end. Pipe #10 was hydrostatically tested at 525 psi and continued at 50 psi increments until failing at a hydrostatic pressure test of 1000 psi, breaking on O/S end.

Pipes #11, 12 and 13 all contained 195 denier material and all passed the 134 psi gauge pressure flexural test, with #11 failing additional flexural tests at 150 psi. Both pipes #12 and #13 were hydrostatically tested from 525 psi until pipe #12 failed in the center at hydrostatic pressure of 990 psi and pipe #13 failed in the center at hydrostatic pressure of 1100 psi. (1100 represents 210% of required hydrostatic test pressure.)

It should be noted that a 4 inch Class 150 pipe is required to pass 525 psi in hydrostatic pressure testing. The majority of the pipe of the test runs of this Test No. 4 withstood hydrostatic pressure up to 900–1000 psi, which is a striking increase in hydrostatic bursting strength in the pipe, which represents about 190% (for 1000 psi) of the required hydrostatic test pressure.

TEST NO. 5

A continuation of the testing on 16 inch Class 150 asbestos-cement pipe was carried out. Again, continuous filament of KEVLAR 49 aramid fiber of each denier was woven within the center 3 feet of each test pipe beginning at the center and pausing for 10 layers before moving to the left in helix approximately 18 inches and pausing again for 10 layers; then, again in helix, returned to center and paused for 10 layers before moving right approximately 18 inches and pausing for 10 layers, and again returning to the center. This rhythm was continued throughout the complete roll-up cycle of approximately 110 asbestos-cement layers on the pipe forming mandrel.

Results

Pipes #1 and #2 contained 195 denier continuous filament of KEVLAR 49 aramid fiber with #1 withstanding hydrostatic pressures up to but bursting at 585 psi. Pipe #2 followed the same test pattern and burst at 580 psi.

Pipe #3 contained 380 denier continuous filament of KEVLAR 49 aramid fiber and burst at 530 psi of hydrostatic pressure.

Pipes #4 and #5 contained 1424 denier continuous filament of KEVLAR 49 aramid fiber with pipe #4 withstanding hydrostatic pressures up to but bursting at 600 psi. Pipe #5 also followed the same test pattern and burst at hydrostatic pressure of 615 psi.

Pipes made during the period of these test runs without the addition of this continuous filament of KEVLAR fiber would only withstand hydrostatic pressures in the 400–425 psi range.

TEST NO. 6

195 Denier continuous filament of KEVLAR 49 aramid fiber was added to two asbestos-cement pipes using different methods than any tried in prior tests. In pipe #7 the filament was applied at points dividing the pipe in three equal sections but without any weaving. In pipe #8 the filament was applied at points dividing the pipe in four equal sections again without weaving. In both pipes the filament was added for the duration of the roll-up cycle.

Results

Pipe #7 burst at hydrostatic pressure of 460 psi.
Pipe #8 burst at hydrostatic pressure of 480 psi.

TEST NO. 7

195 Denier continuous filament of KEVLAR 49 aramid fiber was wound into the asbestos-cement pipe with a very open spiral from end to end and back again for the duration of the roll-up cycle in Pipe #9.

Results

Pipe #9 burst at hydrostatic pressure of 480 psi.

TEST NO. 8

A follow-up series of tests on 4 inch Class 150 asbestos-cement pipe and Class 200 O.D. asbestos-cement pipe similar to previous tests. Only the results of the flexural tests are available to date. Pipe #1 was wound with 195 denier continuous filament of KEVLAR 49 aramid fiber with an open spiral beginning one foot on each side of center and continuing past center toward opposite end. Pipe #2 was wound with 195 denier continuous filament of KEVLAR 49 aramid fiber with an open spiral beginning 6 inches from one end and continuing to within 6 inches of the opposite end. Pipe #3 was wound with 195 denier continuous filament of KEVLAR 49 aramid fiber in the manner of #1 but beginning 2 feet on either side of center (195 denier).

Results

Pipe #1 with a 5.36 O.D. was flexurally tested at the required 168 psi gauge pressure for Class 200 pipe, and on each subsequent test pressure was increased until the pipe broke at 210 psi gauge pressure (25% above required pressure for the flexural test).

Pipe #2 with a 5.16 O.D. was flexurally tested at the required 134 psi gauge pressure for Class 150 pipe and flexurally retested at 150 psi gauge pressure (12% above required pressure for the flexural test) and did not break.

Pipe #3 with a 5.36 O.D. was flexurally tested at the required 168 psi gauge pressure for Class 200 pipe and flexurally retested at 182 psi gauge pressure (8% above required pressure for the flexural test) and did not break.

TEST NO. 9

Asbestos-cement pipes #4, #5, #6 and #7 were wound with continuous filament of KEVLAR 49 aramid fiber with a close spiral weave over the middle 2-3 feet of each pipe using a single strand of the 195 denier filament. The product pipes were subjected to flexural tests.

Results:

|     | Class | O.D. | Gauge Pressure Required | Maximum Pressure Resisted in Flexural Test | Pressure At Failure |
| --- | --- | --- | --- | --- | --- |
| #4 | 200 | 5.45 | 168 psi | 218 psi | 225 psi* |
| #5 | 200 | 5.42 | 168 psi | 212 psi | — |
| #6 | 200 | 5.40 | 168 psi | 192 psi | — |
| #7 | 150 | 5.13 | 134 psi | 150 psi | 160 psi** |

*34% above required load
**19% above required load

TEST NO. 10

Asbestos-cement pipes #8 and #9 were wound with a close spiral weave over the middle 6 feet with two strands of 195 denier continuous filament of KEVLAR 49 aramid fiber simultaneously. The product pipes were subjected to flexural tests.

Results:

|     | Class | O.D. | Gauge Pressure Required | Maximum Pressure Resisted in Flexural Test | Pressure At Failure |
| --- | --- | --- | --- | --- | --- |
| #8 | 150 | 5.08 | 134 psi | 134 psi | — |
| #9 | 150 | 5.11 | 134 psi | 152 psi | 168 psi* |

*25% above required load

TEST NO. 11

Asbestos-cement pipes #10 and #11 were wound with a close spiral weave over the middle 6 feet with two strands of 380 denier continuous filament of KEVLAR 49 aramid fiber simultaneously.

Results:

|     | Class | O.D. | Gauge Pressure Required | Maximum Pressure Resisted in Flexural Test | Pressure At Failure |
| --- | --- | --- | --- | --- | --- |
| #10 | 200 | 5.45 | 168 psi | 185 psi | 230 psi* |
| #11 | 200 | 5.40 | 168 psi | 185 psi | — |

*37% above required load

TEST NO. 12

Pipes #12 through 17 were wound with a close spiral weave over the middle 4 feet with one strand of 195 denier continuous filament of KEVLAR 49 aramid fiber and one strand of 380 denier continuous filament of KEVLAR 49 aramid fiber simultaneously.

Results:

|     | Class | O.D. | Gauge Pressure Required | Maximum Pressure Resisted in Flexural Test | Pressure At Failure |
| --- | --- | --- | --- | --- | --- |
| #12 | 200 | 5.41 | 168 psi | 168 psi | — |
| #13 | 200 | 5.41 | 168 psi | 168 psi | — |
| #14 | 200 | 5.44 | 168 psi | 180 psi | 210 psi* |
| #15 | 200 | 5.41 | 168 psi | 185 psi | — |
| #16 | 200 | 5.40 | 168 psi | 188 psi | 210 psi* |
| #17 | 200 | 5.40 | 168 psi | 190 psi | — |

*25% above the required load

The reason pressure values are not set forth for pipe #12, 13, 15 and 17 in the foregoing table in the "Pressure At Failure" column is that such pipe were not tested to destruction but held for other testing. In the flexural test each psi gauge pressure represents 8.209 lbs. actual applied load. "O.D." in all tests means outer diameter of the pipe. The "D/S" end of the pipe in the tests is that end of the pipe on the drive side of the mandrel; the "O/S" end of the pipe in the tests is that end of the pipe on the operator's side of the mandrel, which is the end opposite the drive side end.

Several of these pipes that were tested to destruction withstood pressures in the flexural tests approaching 25-35% above the required load but it should be pointed out that all were tested at pressures equivalent to the highest breaking load of any compatible pipe produced without the addition of this material. The average breaking load of the test pipe in the flexural tests is approximately 20% higher than the average breaking load of a like number of standard pipe with highest strength.

DESCRIPTION OF THE PREFERRED EMBODIMENTS

KEVLAR 49 fiber is the preferred aromatic polyamide fiber for use herein.

The preferred form of the continuous filament is yarn.

What is claimed is:

1. A method for producing non-stressed, reinforced, rigid, substantially inflexible, asbestos-cement pipe well adapted for conveying water under pressure which comprises forming a wet asbestos-cement sheet from an aqueous asbestos fiber-cement slurry, removing water from the wet asbestos-cement sheet, winding the dewatered, still wet sheet on a pipe-forming mandrel as a plurality of spirally wound, wet asbestos-cement layers thereon while applying pressure to the wet sheet on the mandrel, winding a continuous filament of an aromatic polyamide fiber taut about at least one of the spirally wound, wet asbestos-cement layers within the interior of the ultimate pipe on the mandrel during the winding of the wet asbestos-cement layers on the mandrel without stretching the continuous filament and substantially without placing the continuous filament in tension, the aromatic polyamide fiber of the continuous filament characterized by having high tensile strength and a low elongation capability, separating the mandrel from the inner surface of the thus-formed pipe, extracting the mandrel from within the pipe, and curing the pipe.

2. The method of claim 1 wherein the pipe is precured subsequent to separating the mandrel from the pipe inner surface and prior to extracting the mandrel from within the pipe.

3. The method of claim 2 wherein the asbestos fiber-cement slurry also contains silica.

4. The method of claim 3 wherein the fiber has tensile strength of at least about 390,000 psi and an elongation of no more than 7%.

5. The method of claim 4 wherein the fiber has tensile strength of about 400,000 psi to about 525,000 psi and an elongation capability of about 2 to about 4%.

6. The method of claim 5 wherein the fiber has tensile strength of about 520,000 psi to about 525,000 psi.

7. The method of claim 4 wherein the continuous filament is yarn.

8. The method of claim 5 wherein the continuous filament is yarn.

9. The method of claim 3 wherein the wet asbestos-cement sheet is formed by at least one rotating sieve cylinder partially immersed in the slurry, the sieve cylinder picking up the slurry as a water-laid, thin, wet asbestos-cement sheet on its sieve surface, water being removed from the wet asbestos-cement sheet on the sieve cylinder surace by being forced through the sieve openings of said sieve cylinder, the still wet asbestos-cement sheet being transferred from the rotating sieve cylinder onto a moving, continuous, water-permeable member and said asbestos-cement sheet being transported on the moving, permeable member to the pipe-forming mandrel for winding thereon while additional water is removed from the asbestos-cement sheet during its transport on the permeable member.

10. The method of claim 9 wherein the permeable member is a porous felt.

11. The method of claim 9 wherein the fiber has tensile strength of about 520,000 psi to about 525,000 psi.

12. The method of claim 11 wherein the permeable member is a porous felt.

13. The method of claim 3 wherein the continuous filament is helically wound about at least one of the asbestos-cement layers within the interior of the pipe.

14. The method of claim 13 wherein the asbestos fiber-cement slurry also contains silica.

15. The method of claim 14 wherein the continuous filament is yarn.

16. The method of claim 14 wherein the continuous filament is helically wound about each of a plurality of the asbestos-cement layers within the pipe interior.

17. The method of claim 14 wherein the continuous filament is helically wound about a central portion of one or more of the asbestos-cement layers within the pipe interior.

18. The method of claim 2 wherein the continuous filament is yarn.

19. The method of claim 3 wherein the continuous filament is yarn.

20. A method for producing non-stressed, reinforced, rigid, substantially inflexible, asbestos-cement pipe well adapted for conveying water under pressure which comprises forming a wet asbestos-cement sheet from an aqueous asbestos fiber-cement slurry, removing water from the wet asbestos-cement sheet, winding the dewatered, still wet sheet on a pipe-forming mandrel as a plurality of convolutely wound, wet asbestos-cement layers thereon while applying pressure to the wet sheet on the mandrel, winding a continuous filament of an aromatic polyamide fiber taut about at least one of the convolutely wound, wet asbestos-cement layers within the interior of the ultimate pipe on the mandrel during the winding of the wet asbestos-cement layers on the mandrel without stretching the continuous filament and substantially without placing the continuous filament in tension, the aromatic polyamide fiber of the continuous filament characterized by having high tensile strength and a low elongation capability, separating the mandrel from the inner surface of the thus-formed pipe, extracting the mandrel from within the pipe, and curing the pipe.

21. A method for producing non-stressed, reinforced, rigid, substantially inflexible, asbestos-cement pipe well adapted for conveying water under pressure which comprises forming a wet asbestos-cement sheet from an aqueous asbestos fiber-cement slurry, removing water from the wet asbestos-cement sheet, applying the dewatered, still wet sheet on the surface of a pipe-forming mandrel, winding a continuous filament of an aromatic polyamide fiber about the wet asbestos-cement and within the interior of the ultimate pipe on the mandrel during the application of the wet asbestos-cement on the mandrel without stretching the continuous filament and substantially without placing the continuous filament in tension, the aromatic polyamide fiber of the continuous filament characterized by having high tensile strength and a low elongation capability, separating the mandrel from the inner surface of the thus-formed pipe, extracting the mandrel from within the pipe, and curing the pipe.

* * * * *

UNITED STATES PATENT AND TRADEMARK OFFICE
CERTIFICATE OF CORRECTION

PATENT NO. : 4,077,577
DATED : March 7, 1978
INVENTOR(S) : James Wright

It is certified that error appears in the above–identified patent and that said Letters Patent are hereby corrected as shown below:

Column 6, line 16, "furing" should read --during--. Column 7, line 61, "cintinuous" should read --continuous--. Column 8, line 59, "crysotile" should read --chrysotile--. Column 12, line 1, "en" should read --end--. Column 13, line 64, --fiber-- should be inserted after "aramid" and before "with". Column 14, line 9, --psi-- should be inserted after "1100" (second occurrence) and before "represents".

Signed and Sealed this

Sixth Day of February 1979

[SEAL]

Attest:

RUTH C. MASON
Attesting Officer

DONALD W. BANNER
Commissioner of Patents and Trademarks